United States Patent
Jacob

(10) Patent No.: US 9,606,015 B2
(45) Date of Patent: Mar. 28, 2017

(54) MEASUREMENT CELL

(71) Applicant: VEGA Grieshaber KG, Wolfach (DE)

(72) Inventor: Joern Jacob, Wolfach (DE)

(73) Assignee: VEGA GRIESHABER KG, Wolfach (DE)

(\*) Notice: Subject to any disclaimer, the term of this patent is extended or adjusted under 35 U.S.C. 154(b) by 253 days.

(21) Appl. No.: 14/515,862

(22) Filed: Oct. 16, 2014

(65) Prior Publication Data
US 2015/0177087 A1 Jun. 25, 2015

(30) Foreign Application Priority Data
Dec. 19, 2013 (DE) .......... 10 2013 226 775

(51) Int. Cl.
G01L 9/12 (2006.01)
G01L 19/06 (2006.01)
G01L 9/00 (2006.01)
G01L 7/08 (2006.01)

(52) U.S. Cl.
CPC .......... *G01L 19/0627* (2013.01); *G01L 7/082* (2013.01); *G01L 9/0075* (2013.01)

(58) Field of Classification Search
CPC ......... G01L 7/08; G01L 7/082; G01L 9/0042; G01L 9/0072; G01L 9/0075; G01L 19/06; G01L 19/0627
USPC .......................................... 73/715, 718, 724
See application file for complete search history.

(56) References Cited

U.S. PATENT DOCUMENTS

| | | | | |
|---|---|---|---|---|
| 5,076,147 A | * | 12/1991 | Hegner | ............... G01L 19/0627 73/715 |
| 5,889,211 A | * | 3/1999 | Maudie | ............... G01L 19/0627 29/407.08 |
| 2005/0252300 A1 | | 11/2005 | Miller | |
| 2008/0110269 A1 | | 5/2008 | Strietzel et al. | |
| 2011/0088460 A1 | | 4/2011 | Mueller | |
| 2011/0146398 A1 | * | 6/2011 | Beck | ..................... G01F 1/6845 73/204.27 |

FOREIGN PATENT DOCUMENTS

| | | |
|---|---|---|
| DE | 39 12 217 A1 | 4/1989 |
| DE | 10 2005 053 861 A1 | 11/2005 |
| DE | 10 2006 056 172 A1 | 11/2006 |
| DE | 10 2008 042 443 A1 | 9/2008 |
| DE | 10 2009 045 164 A1 | 9/2009 |
| DE | 10 2011 084612 A1 | 4/2013 |
| WO | WO 2013/041321 A1 | 3/2013 |

\* cited by examiner

*Primary Examiner* — Benjamin Schmitt
(74) *Attorney, Agent, or Firm* — Juneau & Mitchell

(57) ABSTRACT

A measuring cell having a measuring cell body and a measuring diaphragm mounted on the measuring cell body, with the measuring diaphragm in direct contact with a measurement environment, so that when the measuring cell is used, as intended, in at least one measurement section of a top surface of the diaphragm that is covered in an anti-stick coating and faces the measurement environment.

15 Claims, 1 Drawing Sheet

MEASUREMENT CELL

CROSS REFERENCE TO RELATED APPLICATIONS

This patent application claims priority to German Patent Application 10 2013 226 775.4, filed on Dec. 19, 2013.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a measuring cell.

Background of the Invention

The current state of knowledge is as follows.

A variety of measuring cells comprising a measuring cell body and a measuring diaphragm, which is mounted on the measuring cell body, are known from the prior art. When the measuring cell is used, as intended, in at least one measurement section of a top surface of the measuring diaphragm that faces the measurement environment, the measuring diaphragm is in direct contact with the measurement environment.

Pressure measuring cells that are configured to operate in a capacitive mode are often used for this purpose. In such pressure measuring cells the electrodes that are located opposite each other are disposed, on the one hand, on an interior side of the measuring diaphragm and, on the other hand, on a base body; and these electrodes form a measurement capacitance. The forces that act on the measuring diaphragm also cause the distance between these electrodes to change, and this change in distance makes it possible to detect a change in the pressure.

In the prior art such measuring cells are used, for example, in pressure measuring devices. In this case it should be noted that in some applications deposits form over time on the measuring diaphragm. These deposits can often be calcareous accretions or slurries that can form a hard crust in the course of operating the pressure measuring device. This hard crust in turn can lead to significant measuring errors, because they influence the rigidity of the measuring diaphragm or more specifically deform the measuring diaphragm due to the resulting layer tension. Not only metallic top surfaces, such as, for example, stainless steels, but also ceramic top surfaces, such as, for example, aluminum oxide, are often used in pressure measuring technology, where they tend to form highly adherent deposits because of the properties of their top surface. In order to ensure constant quality of the measurement, it is, therefore, necessary, for the user to perform frequent maintenance of such pressure measuring devices, in order to remove the material build-ups. In addition to the drawback that frequent maintenance is necessary, there is also the risk that the measuring diaphragm will be damaged in the course of removing the build-ups.

This is the starting point of the present invention.

The object of the present invention is to provide a pressure measuring cell, which prevents such material build-ups, significantly reduces or at least makes it significantly easier to remove any residual build-ups.

This engineering object is achieved by means of a measuring cell exhibiting the features disclosed herein.

BRIEF SUMMARY OF THE INVENTION

In a preferred embodiment, a measuring cell comprising a measuring cell body and a measuring diaphragm, mounted on the measuring cell body, wherein the measuring diaphragm is in direct contact with a measurement environment, such that at least one measurement section of a top surface of the diaphragm is covered with an anti-stick coating and faces the measurement environment.

In another preferred embodiment, the measuring cell as described herein, wherein the anti-stick coating is applied over the whole top surface of the diaphragm that faces the measurement environment.

In another preferred embodiment, the measuring cell as described herein, wherein the anti-stick coating is additionally disposed on a lateral face of the diaphragm that is adjacent to the top surface facing the measurement environment.

In another preferred embodiment, the measuring cell as described herein, wherein the diaphragm is mounted on the base body by means of a circumferential joint, and that the anti-stick coating covers the joint.

In another preferred embodiment, the measuring cell as described herein, wherein the anti-stick coating at least partially covers a lateral face of the base body that is adjacent to the joint; and that said anti-stick coating covers at least 1/10 of said lateral face of the base body.

In another preferred embodiment, the measuring cell as described herein, wherein the anti-stick coating covers at least 1/3 of said lateral face of the base body.

In another preferred embodiment, the measuring cell as described herein, wherein the anti-stick coating covers at least 1/2 of said lateral face of the base body.

In another preferred embodiment, the measuring cell as described herein, wherein the anti-stick coating has a contact angle for water greater than 90 deg.

In another preferred embodiment, the measuring cell as described herein, the anti-stick coating has a coating temperature of less than 200 deg. C., preferably less than 150 deg. C.

In another preferred embodiment, the measuring cell as described herein, wherein the anti-stick coating is formed polymer free.

In another preferred embodiment, the measuring cell as described herein, wherein the anti-stick coating is formed as a ceramic coating, preferably from silicon carbide.

In another preferred embodiment, the measuring cell as described herein, wherein the anti-stick coating has a layer thickness between 1 µm and 40 µm, preferably 10 µm.

In another preferred embodiment, the measuring cell as described herein, wherein the measuring cell body and/or the measuring diaphragm is and/or are formed from ceramic.

In another preferred embodiment, the measuring cell as described herein, wherein the joint is produced by means of a solder glass or a hard solder.

DETAILED DESCRIPTION OF THE INVENTION

Figure 1:
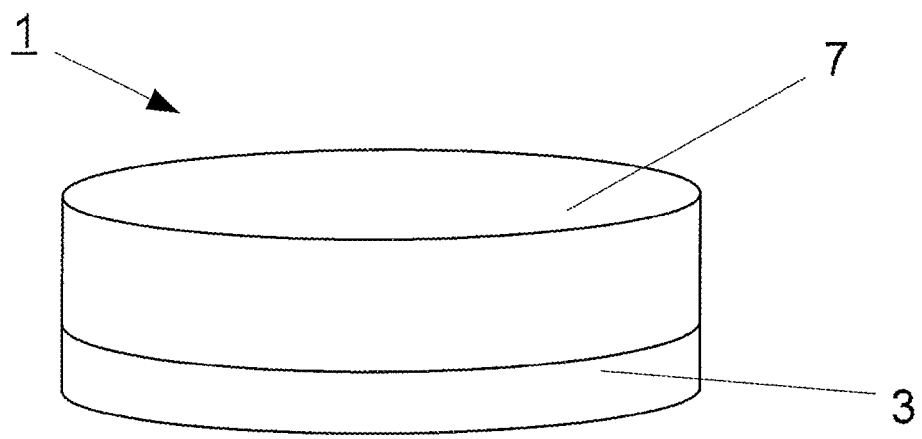
FIG. 1 is a line drawing evidencing a perspective view of an embodiment that is shown as an example of a measuring cell with an anti-stick coating.

An inventive measuring cell comprising a measuring cell body and a measuring diaphragm mounted on the measuring cell body, wherein the measuring diaphragm is in direct contact with the measurement environment, when the measuring cell is used, as intended, in at least one measurement section of a top surface of the diaphragm that faces the measurement environment, is characterized in that an anti-stick coating is disposed in at least the measurement section. A suitable anti-stick coating can prevent, on the one hand, the build-up of calcareous deposits or slurries as well as the formation of encrustations in the measurement area, in which the diaphragm is in contact with the measurement environment, and, on the other hand, can make it much easier to remove such encrustations, when they have occurred, nevertheless.

Preferred is an anti-stick coating, which upgrades the good properties of the base material of the measuring cell or more specifically the measuring diaphragm with an anti-stick action without degrading other properties, for example, the abrasion resistance, the corrosion resistance or the measuring signal.

It is very simple in terms of manufacturing, if the anti-stick coating is applied over the whole top surface of the diaphragm that faces the measurement environment. In this case applying the anti-stick coating over the whole top surface is particularly easy, because then it is possible to dispense with structuring the anti-stick coating. This anti-stick coating can be applied with ease onto the external side of the measuring diaphragm by, for example, a variety of deposition methods, for example, chemical vapor deposition, by coating by deposition, sputtering or any other suitable method.

In addition, the anti-stick coating can also be disposed on a lateral face of the diaphragm that is adjacent to the top surface facing the measurement environment. This can be configured, especially if the diaphragm is mounted on the base body by means of a circumferential joint, in such a way that the anti-stick coating also covers at least partially the joint and preferably a lateral face of the base body that is adjacent to the joint. In this case the anti-stick coating covers preferably 1/10, even more preferred 1/3 and most highly preferred 1/2 of the lateral face of the base body. Due to the fact that the anti-stick coating is disposed on both the top surface of the measuring diaphragm and its lateral face, and on the joint and the base body of the measuring cell, the objective is achieved that, on the one hand, a large portion of the measuring cell according to the invention can be in direct contact with the measurement environment; and that, on the other hand, effective protection against corrosion is achieved for the circumferential joint.

In this context a preferred anti-stick coating has a contact angle for water of preferably greater than 90 deg., and a surface tension of preferably less than 30 mN/m.

A particularly good integration of the application of the anti-stick coating into a production process of a measuring cell can be achieved, if the anti-stick coating has a coating temperature of less than 200 deg. C., preferably less than 150 deg. C. A coating temperature of less than 200 deg. C. or less than 150 deg. C. makes it possible to apply the anti-stick coating on the measuring cell, when the measuring diaphragm is already connected to the base body of the measuring cell. This approach takes into consideration, in particular, the circumferential joint, which can be produced, for example, by means of a solder glass or a hard solder It is possible to achieve for the anti-stick coating a high resistance to abrasion, if said anti-stick coating is formed without polymers.

Ceramic coatings, made, for example, of silicon carbide, lend themselves particularly well to such an anti-stick coating. Silicon carbide has a contact angle for water of approximately 95 deg., which corresponds to a surface tension of about 25 mN/m. In addition, silicon carbide has a Vickers hardness of more than 2,300. In comparison, the Vickers hardness of aluminum oxide is at 1,900; and, as a result, the respective properties of aluminum oxide are even improved by the anti-stick coating.

At the same time a preferred anti-stick coating has a layer thickness between 1 μm and 40 μm, where a layer thickness of 10 μm is preferred.

Typical measuring cells, in which such an anti-stick coating can be used, comprise a base body and/or a measuring diaphragm, wherein the joint between the measuring diaphragm and the base body is produced preferably by means of a solder glass or a hard solder.

DETAILED DESCRIPTION OF THE FIGURES

FIG. 1 is a perspective view of a measuring cell 1, which is designed as a ceramic pressure measuring cell in the present embodiment. The measuring cell 1 has a measuring cell body 3. A measuring diaphragm 5 is mounted on the front face of said measuring cell body by means of a circumferential joint 13 made of a solder glass. Metallization is mounted on both the top surface of the measuring cell body 3 and the top surface of the measuring diaphragm 5, the two top surfaces facing each other. Said metallizations form a measuring capacitor, by means of which a change in the distance between the measuring diaphragm 5 and the base body 3 and, as a result, a change in the pressure, can be detected.

Furthermore, the measuring cell 1 has an anti-stick coating 7, which covers the measuring diaphragm 5, the circumferential joint 13 and a subsection of a lateral face 12 of the measuring cell body 3.

Figure 2:
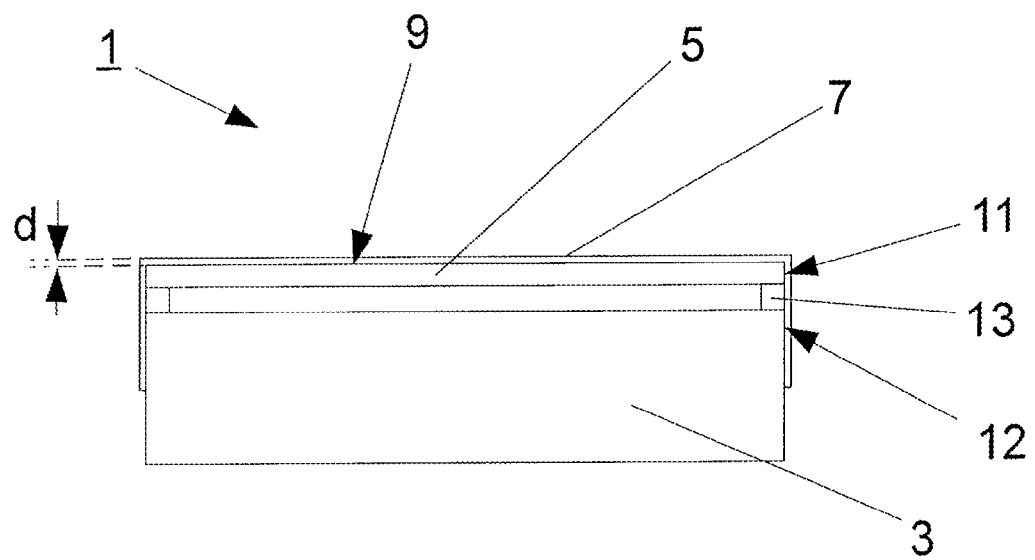
FIG. 2 is a line drawing evidencing a sectional view of the measuring cell from FIG. 1.

The arrangement of the anti-stick coating 7 on the measuring cell 1 is shown in FIG. 2.

FIG. 2 is a sectional view of the measuring cell 1, shown in FIG. 1. In this case the relative sizes do not appear drawn to scale for the sake of a better overview.

It can be seen very clearly in FIG. 2 that the anti-stick coating 7 is applied over the whole top surface 9 of the measuring diaphragm 5, over a lateral face of the measuring diaphragm 11 and over the circumferential joint 13 and a lateral face of the base body 12, which is mounted so as to adjoin the joint 13. Thus, it is achieved in this way that the anti-stick coating 7 covers the circumferentially disposed joint 13 made of a solder glass and, as a result, is effectively protected against influences of the measuring environment.

In the present exemplary embodiment the anti-stick coating 7 has a layer thickness d of 10 μm. This layer thickness d ensures that the positive properties of the measuring cell 1, which may be found under said layer, are maintained, in particular, in the area of the measuring diaphragm 5 and are even improved by the anti-stick coating 7.

In the present exemplary embodiment the anti-stick coating 7 is applied on a ceramic measuring cell 1 made of aluminum oxide; and said anti-stick coating is made of silicon carbide.

In comparison to aluminum oxide, silicon carbide has properties that are improved in terms of the abrasion resistance and can be applied, in particular, with good bonding strength on the materials that are used, in the present case ceramic and glass. In addition, silicon carbide is allowed for food applications and exhibits a thermal coefficient of expansion that is similar to that of the measuring diaphragm 5, so that no shear stresses can develop between the anti-stick coating and the measuring diaphragm 5.

The improved surface structure of the silicon carbide that can be applied, for example, by a CVD process, makes it possible to significantly reduce the calcareous build-up or crudding of slurries, both of which often lead to problems, and to make removal much easier.

In contrast to the prior art, such an approach can significantly reduce the resulting longer maintenance intervals; and, in addition, the risk of damage to the measuring diaphragm 5 is significantly reduced in the course of removing the material build-up.

LIST OF REFERENCE NUMBERS

1 measuring cell
3 measuring cell body
5 measuring diaphragm
7 anti-stick coating
9 top surface
11 lateral face of the diaphragm
12 lateral face of the base body
13 joint
d layer thickness The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A measuring cell comprising a measuring cell body and a measuring diaphragm, mounted on the measuring cell body, wherein the measuring diaphragm is in direct contact with a measurement environment, such that at least one measurement section of a top surface of the diaphragm is covered with an anti-stick coating and faces the measurement environment, wherein the anti-stick coating is additionally disposed on a lateral face of the diaphragm that is adjacent to the top surface facing the measurement environment, wherein the diaphragm is mounted on a base body by means of a circumferential joint, and that the anti-stick coating covers the joint, and wherein the anti-stick coating at least partially covers a lateral face of the base body that is adjacent to the joint.

2. The measuring cell of claim 1, wherein the anti-stick coating is applied over the whole top surface of the diaphragm that faces the measurement environment.

3. The measuring cell of claim 1, wherein the anti-stick coating at least partially covers a lateral face of the base body that is adjacent to the joint; and that said anti-stick coating covers at least $\frac{1}{10}$ of said lateral face of the base body.

4. The measuring cell of claim 3, wherein the anti-stick coating covers at least $\frac{1}{3}$ of said lateral face of the base body.

5. The measuring cell of claim 3, wherein the anti-stick coating covers at least $\frac{1}{2}$ of said lateral face of the base body.

6. The measuring cell of claim 1, wherein the anti-stick coating has a contact angle for water greater than 90 deg.

7. The measuring cell of claim 1, wherein the anti-stick coating has a coating temperature of less than 200 deg. C.

8. The measuring cell of claim 7, wherein the coating temperature is less than 150 deg. C.

9. The measuring cell of claim 1, wherein the anti-stick coating is formed polymer free.

10. The measuring cell of claim 1, wherein the anti-stick coating is formed as a ceramic coating.

11. The measuring cell of claim 10, wherein the anti-stick coating is silicon carbide.

12. The measuring cell of claim 1, wherein the anti-stick coating has a layer thickness between 1 µm and 40 µm.

13. The measuring cell of claim 12, wherein the anti-stick coating has a layer thickness of 10 µm.

14. The measuring cell of claim 1, wherein the measuring cell body and/or the measuring diaphragm is and/or are formed from ceramic.

15. The measuring cell of claim 1, wherein the joint is produced by means of a solder glass or a hard solder.

* * * * *